United States Patent
Malaescu et al.

(10) Patent No.: US 10,560,690 B2
(45) Date of Patent: *Feb. 11, 2020

(54) METHOD FOR DYNAMICALLY CALIBRATING AN IMAGE CAPTURE DEVICE

(71) Applicant: FotoNation Limited, Galway (IE)

(72) Inventors: Alexandru Malaescu, Bucharest (RO); Florin Nanu, Bucharest (RO)

(73) Assignee: FotoNation Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/208,091

(22) Filed: Dec. 3, 2018

(65) Prior Publication Data

US 2019/0158822 A1    May 23, 2019

Related U.S. Application Data

(63) Continuation of application No. 15/605,159, filed on May 25, 2017, now Pat. No. 10,148,945.

(51) Int. Cl.
*H04N 17/00* (2006.01)
*H04N 5/232* (2006.01)
(Continued)

(52) U.S. Cl.
CPC .......... *H04N 17/002* (2013.01); *G03B 13/36* (2013.01); *G03B 43/00* (2013.01); *G06T 7/70* (2017.01);
(Continued)

(58) Field of Classification Search
CPC .. H04N 5/23212; H04N 17/002; G03B 13/36; G03B 43/00; G06T 7/80
See application file for complete search history.

(56) References Cited

U.S. PATENT DOCUMENTS 8,970,770 B2    3/2015 Nanu et al.
10,148,945 B1 * 12/2018 Malaescu ............... G06T 7/80
(Continued)

FOREIGN PATENT DOCUMENTS

| EP | 6151048 A1 | 4/2017 |
| WO | WO/2016/000874 A1 | 5/2015 |
| WO | WO2016/091545 A1 | 6/2016 |

OTHER PUBLICATIONS

European Patent Office, Extended European Search Report for EP App. No. 18170272.1 dated Oct. 26, 2018 for "Method for Dynamically Calibrating an Image Capture Device," 13 pages.

*Primary Examiner* — Daniel M Pasiewicz

(57) ABSTRACT

A method for dynamically calibrating an image capture device comprises: a) determining a distance ($D_{CRT}$, $D_{EST}$) to an object within a scene; b) determining a first lens actuator setting ($DAC^{INIT}$) for the determined distance; c) determining a second lens actuator setting ($DAC^{FOCUS}$) providing maximum sharpness for the object in a captured image of the scene; and d) storing the determined distance ($D_{CRT}$, $D_{EST}$) and the first and second lens actuator settings. These steps are repeated at a second determined distance separated from the first determined distance. A calibration correction ($ERR_{NEAR}^{PLP}$, $ERR_{FAR}^{PLP}$) for stored calibrated lens actuator settings ($DAC_{NEAR}^{PLP}$, $DAC_{FAR}^{PLP}$) is determined as a function of at least: respective differences between the second lens actuator setting ($DAC^{FOCUS}$) and the first lens actuator setting ($DAC^{INIT}$) for each of the first and second determined distances; and the stored calibrated lens actuator settings are adjusted according to the determined calibration corrections.

20 Claims, 3 Drawing Sheets

(51) Int. Cl.
 *G06T 7/80* (2017.01)
 *G06T 7/70* (2017.01)
 *G03B 13/36* (2006.01)
 *G03B 43/00* (2006.01)
 *G02B 7/08* (2006.01)

(52) U.S. Cl.
 CPC ........... *G06T 7/80* (2017.01); *H04N 5/23212* (2013.01); *G02B 7/08* (2013.01); *H04N 5/23219* (2013.01)

(56) References Cited

U.S. PATENT DOCUMENTS

| | | |
|---|---|---|
| 2009/0102403 A1 | 4/2009 | Lule |
| 2009/0202235 A1 | 8/2009 | Li et al. |
| 2016/0014404 A1 | 1/2016 | Krestyannikov |
| 2016/0147131 A1 | 5/2016 | Richards et al. |
| 2016/0165129 A1 | 6/2016 | Malaescu et al. |
| 2017/0155896 A1 | 6/2017 | Malaescu et al. |
| 2018/0041754 A1 | 2/2018 | Nanu et al. |

* cited by examiner

METHOD FOR DYNAMICALLY CALIBRATING AN IMAGE CAPTURE DEVICE

FIELD

The present invention relates to a method for dynamically calibrating an image capture device.

BACKGROUND

Referring now to FIG. 1, a typical auto-focus (AF) module 10 for a camera module 12 within an image capture device can obtain an estimate for the distance from the camera module to the target object, for example, from a laser device or stereo camera system 14.

Knowing the estimated subject distance, the auto-focus module 10 can compute a required physical position for a lens 16 to bring the target object into focus. As explained in WO 2016/000874 (Ref: FN-396-PCT), the disclosure of which is herein incorporated by reference, lens position is typically controlled by a lens actuator 18 which is driven by a digital to analog convertor (DAC)—often using an 8-bit DAC code with 255 distinct voltage output levels, or a 10-bit DAC code with 1024 voltage levels—provided by the AF module 10. Thus the AF module 10 determines a required DAC code for a subject distance and the DAC converts the DAC code into an equivalent analog actuator voltage or current value depending on the actuator output circuitry, for example, depending on whether the lens 16 comprises a VCM (voice coil module) or MEMs (micro-electromechanical systems) lens actuator, to determine the lens position.

Once the relationship between DAC code and lens position is determined, for example, there can be a linear relationship between the two, the camera module can be calibrated by adjusting the DAC codes for infinity and macro distances:

$DAC_{FAR}[t]$ physical lens position to focus at far (infinity) distance at time[$t$]     [1]

$DAC_{NEAR}[t]$ physical lens position to focus at near (macro) distance at time[$t$]     [2]

These calibration parameters can be determined during a production line process (PLP) and their values stored in a non-volatile memory 20 inside the camera module 12 or elsewhere in the camera.

Thus, the auto-focus module 10 can determine the required DAC code to be supplied to the lens actuator 18 as a function of the distance to the target object as well as $DAC_{NEAR}[t]$ and $DAC_{FAR}[t]$.

It is known that the camera module 12 may be affected by operating conditions such as SAG (gravity influence) or thermal (temperature influence) and WO 2016/000874 (Ref: FN-396-PCT) discloses some methods to compensate for SAG and thermal effects by adjusting $DAC_{NEAR}[t]$ and $DAC_{FAR}[t]$ according to operating conditions.

Nonetheless, there may be other components contributing to calibration error including inaccuracies, due to some limitations of the PLP or, as disclosed in WO 2016/000874 (Ref: FN-395-PCT), camera module performance drifting over time, for example, due to device aging or even device on-time.

If PLP, SAG or thermal errors are not compensated accordingly, the DAC code computed by AF module will not provide proper focus on the target object.

The camera module may then be required to hunt for focus and this both impacts adversely on focus speed as well as causing an unacceptable lens wobble effect within a preview stream.

It is an object of the present application to mitigate these problems.

SUMMARY

According to the present invention there is provided a method for dynamically calibrating an image capture device according to claim 1.

According to a second aspect there is provided a computer program product comprising a computer readable medium on computer readable instructions are stored and which when executed on an image capture device are arranged to perform the steps of claim 1.

According to a third aspect there is provided an image capture device configured to perform the steps of claim 1.

The present method runs on an image capture device, possibly within a camera module, and dynamically compensates for calibration errors while the user is operating the device.

The method does not affect the production line process and collects the necessary data while the user is operating the device, without adversely affecting the user experience. The method can improve auto-focus speed and minimize lens wobble when estimating the calibration error and then updating the calibration parameters.

The method can be triggered from time to time to check if the calibration parameters haven't been affected by for example, camera ageing, and if so, perform the necessary corrections.

BRIEF DESCRIPTION OF THE DRAWINGS

An embodiment of the invention will now be described, by way of example, with reference to the accompanying drawings, in which.

DESCRIPTION OF THE EMBODIMENT

Figure 1:
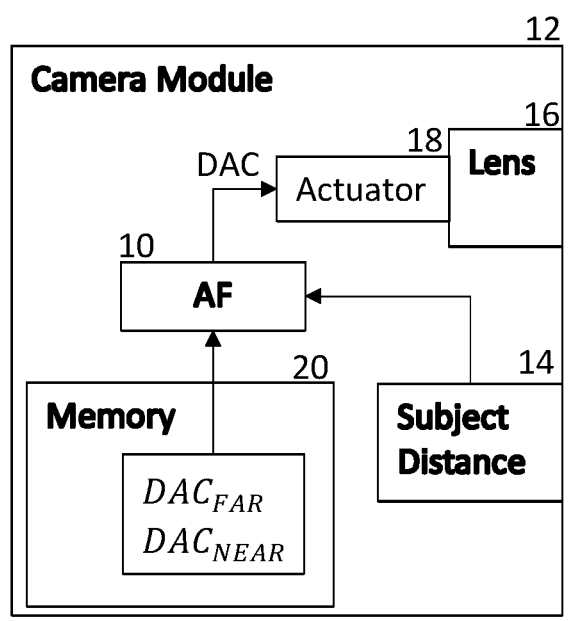
FIG. 1 illustrates schematically a typical auto-focusing camera module.

Calibration errors, other than those caused by SAG or thermal effects and referred to herein generally as PLP errors can be quantified as follows:

$$\begin{cases} ERR_{FAR}^{PLP} = DAC_{FAR}[t] - DAC_{FAR}^{PLP} & [3] \\ ERR_{NEAR}^{PLP} = DAC_{NEAR}[t] - DAC_{NEAR}^{PLP} & [4] \end{cases}$$

where:

$DAC_{FAR}^{PLP}$ and $DAC_{NEAR}^{PLP}$ are the stored calibration parameters for the camera module (CM). This can be measured and determined at production time, or they can be updated from time to time during camera operation as disclosed in WO 2016/000874 (Ref: FN-395-PCT).

Thus, $DAC_{FAR}[t]$ and $DAC_{NEAR}[t]$ are the desired corrected calibration parameters at time [t], while $ERR_{FAR}^{PLP}$ and $ERR_{NEAR}^{PLP}$ are the respective errors in these parameters.

To illustrate the impact of the errors in equations [3] and [4] against the final focus position, let us assume a target object is placed at distance [D] from the camera. Typically, in a handheld image capture device such as a consumer camera, smartphone, tablet computer or equivalent, the object of interest is a human face. The corresponding lens position [$DAC_D$] to focus at distance [D] is given by the following formula:

$$DAC_D = DAC_{FAR}[t] + \frac{1}{m} * (L_D - L_{FAR}) \quad [5]$$

Assuming a linear DAC function, the additional parameters together with their formula are detailed in table 1:

TABLE 1

List of parameters used for mapping the distance to the lens position (DAC)

| Parameter | Description | Unit | Formula | |
|---|---|---|---|---|
| $DAC_{FAR}{}^{[t]}$ | See [1] | DAC codes | $ERR_{FAR}{}^{PLP} + DAC_{FAR}{}^{PLP}$ | [6] |
| $DAC_{NEAR}{}^{[t]}$ | See [2] | DAC codes | $ERR_{NEAR}{}^{PLP} + DAC_{NEAR}{}^{PLP}$ | [7] |
| m | Actuation slope | mm/ DAC codes | $\dfrac{L_{NEAR} - L_{FAR}}{DAC_{NEAR}[t] - DAC_{FAR}[t]}$ | [8] |
| $L_{FAR}$ | Lens displacement to focus at $D_{FAR}$ | mm | $L_{FAR} = \dfrac{f^2}{D_{FAR} - f}$ | [9] |
| $L_{NEAR}$ | Lens displacement to focus at $D_{NEAR}$ | mm | $L_{NEAR} = \dfrac{f^2}{D_{NEAR} - f}$ | [10] |
| $L_D$ | Lens displacement to focus at current distance [D] | mm | $L_D = \dfrac{f^2}{D - f}$ | [11] |
| $D_{FAR}$ | Far distance (set by CM manufacturer) | mm | — | |
| $D_{NEAR}$ | Near distance (set by CM manufacturer) | mm | — | |
| f | Focal length of the system | mm | — | |

Nonetheless, it will be appreciated that the invention is also applicable to a non-arithmetic, but nonetheless linear relationship between DAC codes and lens position.

Equations [9], [10] and [11] are derived from thin lens equation:

$$\frac{1}{f} = \frac{1}{f + L_D} + \frac{1}{D}$$

Replacing [6], [7], [8] in [5], the new formula for computing the DAC value becomes:

$$\begin{cases} DAC_D = DAC_D^{INIT} + ERR_D & [12] \\ \text{Where:} \\ DAC_D^{INIT} = DAC_{FAR}^{PLP} + \dfrac{(DAC_{NEAR}^{PLP} - DAC_{FAR}^{PLP})*(L_D - L_{FAR})}{(L_{NEAR} - L_{FAR})} & [13] \\ ERR_D = ERR_{FAR}^{PLP} + (ERR_{NEAR}^{PLP} - ERR_{FAR}^{PLP})*\dfrac{(L_D - L_{FAR})}{(L_{NEAR} - L_{FAR})} & [14] \end{cases}$$

Replacing [9], [10], [11] in [13] and [14], the final formula which estimates the DAC value is given by:

$$\begin{cases} DAC_D = DAC_D^{INIT} + ERR_D & [15] \\ \text{Where:} \\ DAC_D^{INIT} = DAC_{FAR}^{PLP} + (DAC_{NEAR}^{PLP} - DAC_{FAR}^{PLP})*\dfrac{(D_{FAR} - D)}{(D_{FAR} - D_{NEAR})} * \dfrac{(D_{NEAR} - f)}{(D - f)} & [16] \\ ERR_D = ERR_{FAR}^{PLP} + (ERR_{NEAR}^{PLP} - ERR_{FAR}^{PLP})*\dfrac{(D_{FAR} - D)}{(D_{FAR} - D_{NEAR})} * \dfrac{(D_{NEAR-f})}{(D - f)} & [17] \end{cases}$$

ERR$_D$ is the overall error generated by PLP errors (ERR$_{FAR}^{PLP}$ and ERR$_{NEAR}^{PLP}$).

Figure 2:
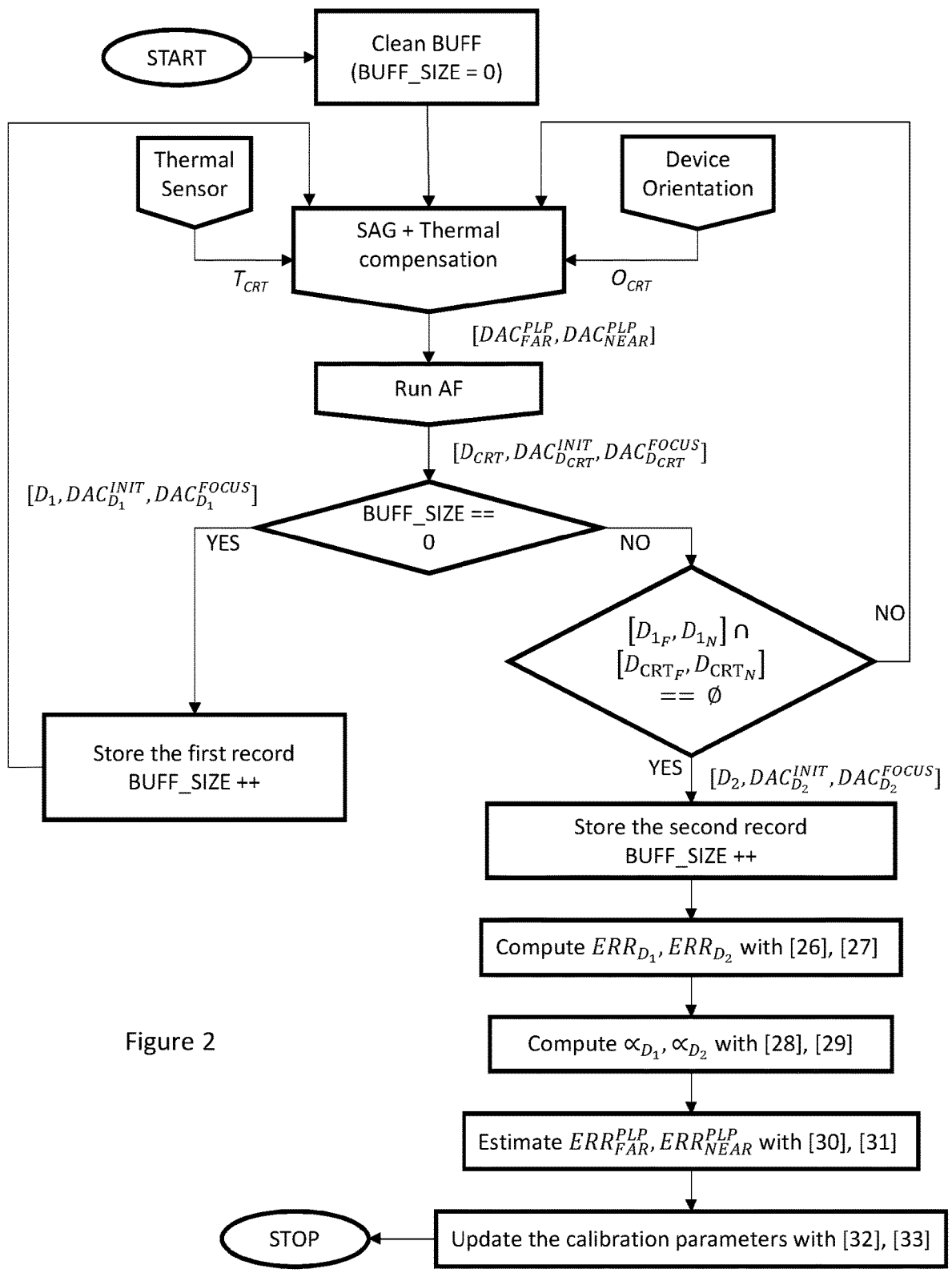
FIG. 2 illustrates a method for dynamically calibrating an image capture device according to a first embodiment of the present invention.

Referring now to FIG. 2, the first step of a compensation method according to one embodiment is to collect input data in an internal buffer (BUFF) while the user is operating the camera. This process can be done transparently without affecting the user experience. An input record should contain the data summarized in table 2. The buffer should have enough space to store at least 2 records.

TABLE 2

Dynamic compensation input data

| Data | Description | Unit |
|---|---|---|
| T$_{CRT}$ | Current sensor temperature (provided by the internal thermal sensor of the CM) | Celsius degrees |
| O$_{CRT}$ | Current device orientation relative to horizontal plane (estimated from the output of the device accelerometer) | Degrees |
| D$_{CRT}$ | Current estimated distance to the object (provided by AF algorithm) | Millimeters |
| DAC$_{D_{CRT}}^{INIT}$ | Initial lens position (provided by AF algorithm based on D$_{CRT}$). | DAC codes |
| DAC$_{D_{CRT}}^{FOCUS}$ | Focus lens position (provided by AF algorithm at optimal focus) | DAC codes |

Sensor temperature [T$_{CRT}$] and device orientation [O$_{CRT}$] are used to adjust the original calibration parameters to compensate for the CM being affected by SAG (gravity) or thermal effects, as disclosed in WO 2016/000874 (Ref: FN-395-PCT). To briefly explain how to compensate SAG and thermal effects, assume that during production, the CM orientation was O$_{PLP}$ and the sensor temperature was T$_{PLP}$.

If the CM is affected by SAG, O$_{CRT}$≠O$_{PLP}$, then the original calibration parameters are converted into the O$_{CRT}$ range. In the present description, this transformation function is represented as SAG below:

[DAC$_{FAR}^{PLP}$, DAC$_{NEAR}^{PLP}$]$_{O_{CRT}}$=SAG(DAC$_{FAR}^{PLP}$, DAC$_{NEAR}^{PLP}$, O$_{PLP}$, O$_{CRT}$)

If the CM is not affected by SAG, the calibration parameters will remain unchanged: [DAC$_{FAR}^{PLP}$, DAC$_{NEAR}^{PLP}$]$_{O_{CRT}}$=[DAC$_{FAR}^{PLP}$, DAC$_{NEAR}^{PLP}$]

If the CM is affected by thermal effect, T$_{CRT}$≠T$_{PLP}$, then the calibration parameters after SAG correction are converted into the T$_{CRT}$ range. Again, a transformation function, called TH below, can be used: [DAC$_{FAR}^{PLP}$, DAC$_{NEAR}^{PLP}$]$_{T_{CRT}}$=TH([DAC$_{FAR}^{PLP}$, DAC$_{NEAR}^{PLP}$]$_{O_{CRT}}$, T$_{PLP}$, T$_{CRT}$)

If the CM is not affected by thermal effects, then the calibration parameters resulting from any SAG correction will remain unchanged: [DAC$_{FAR}^{PLP}$, DAC$_{NEAR}^{PLP}$]$_{T_{CRT}}$=[DAC$_{FAR}^{PLP}$, DAC$_{NEAR}^{PLP}$]$_{O_{CRT}}$ Note that in each case SAG( ) and TH( ) can involve lookup tables, and again details of how to adjust the DAC$_{FAR}^{PLP}$ and DAC$_{NEAR}^{PLP}$ values to take into account temperature and orientation are disclosed in WO 2016/000874 (Ref: FN-395-PCT).

At this point, PLP errors are unknown. For estimating them, data is collected during AF module operation as follows:

1. Estimate [D$_{CRT}$] using the laser device or a stereo camera system 14;
2. Use [16] to compute the initial lens position [DAC$_{D_{CRT}}^{INIT}$]

$$DAC_{D_{CRT}}^{INIT} = DAC_{FAR}^{PLP} + (DAC_{NEAR}^{PLP} - DAC_{FAR}^{PLP}) * \frac{(D_{FAR} - D_{CRT})}{(D_{FAR} - D_{NEAR})} * \frac{(D_{NEAR} - f)}{(D_{CRT} - f)}$$

3. Set the lens position to DAC$_{D_{CRT}}^{INIT}$ and start searching the focus position around DAC$_{D_{CRT}}^{INIT}$. The lens should be moved forth or back until the best contrast value is achieved. The lens position with the best contrast value will be the focus position [DAC$_{D_{CRT}}^{FOCUS}$]

For large PLP errors, the DAC DAC$_{D_{CRT}}^{FOCUS}$ focus position will be far from the initial position DAC DAC$_{D_{CRT}}^{INIT}$. The focus speed will be slow and the lens wobble effect strongly visible. For small errors, the DAC DAC$_{D_{CRT}}^{FOCUS}$ focus position will be closer to the initial position DAC$_{D_{CRT}}^{INIT}$. The focus speed will be higher and the lens wobble effect less visible.

The goal of dynamic compensation method is to use the above data (provided by steps 1, 2 and 3) to estimate PLP errors. Once the estimation is done, the calibration parameters (DAC$_{FAR}^{PLP}$, DAC$_{NEAR}^{PLP}$) will be properly updated and the lens position provided by [16] will be the focus position. Focus sweeping will not be necessary anymore, and thus the AF module speed will be improved and the lens wobble effect reduced.

One way to define sufficiently good accuracy, is to restrict the errors of [D$_{CRT}$] and [DAC$_{D_{CRT}}^{INIT}$] to less than set thresholds as follows:

$$|err_{D_{CRT}}| < \frac{DOF_{D_{CRT}}}{4} \quad [18]$$

$$|err_{DAC_{D_{CRT}}^{FOCUS}}| < \frac{DAC_{STEP}}{2} \quad [19]$$

To understand the meaning of DOF$_{D_{CRT}}$ and DAC$_{STEP}$, additional parameters are summarized in table 3.

TABLE 3

DOF Parameters

| Parameter | Description | Unit | Formula |  |
|---|---|---|---|---|
| DOF$_D$ | Depth of field at distance [D] | mm | DOF$_D$ = D$_F$ − D$_N$ | [20] |
| D$_F$ | Far limit of DOF at distance [D] | mm | $D_F = \frac{Df^2}{f^2 - Nc(D-f)}$ | [21] |
| D$_N$ | Near limit of DOF at distance [D] | mm | $D_N = \frac{Df^2}{f^2 + Nc(D-f)}$ | [22] |
| N | Relative aperture (F#) of the lens system | — | — |  |
| c | Circle of confusion | mm | c = 2 * P$_S$ | [23] |
| P$_S$ | Pixel size | mm | — |  |
| f | Focal length of the system | mm | — |  |

DAC$_{STEP}$ is the absolute difference between the corresponding DAC values at D$_F$ and D$_N$ distances. Using [15], [16] and assuming ERR$_{D_F}$≈ERR$_{D_N}$, an estimated value of DAC$_{STEP}$ is given by:

$$DAC_{STEP} = |DAC_{D_F} - DAC_{D_N}| \iff \quad [24]$$

$$\iff DAC_{STEP} = \left| \frac{(DAC_{NEAR}^{PLP} - DAC_{FAR}^{PLP}) * (D_{NEAR} - f) * (D_{FAR} - f)}{(D_{FAR} - D_{NEAR})} \right| * \left| \frac{(D_N - D_F)}{(D_F - f) * (D_N - f)} \right|$$

$DAC_{STEP}$ should be a constant value (should not vary with the distance D).

The second step of the compensation method is to estimate the errors [3] and [4] and to update the calibration parameters. It requires, two input records ($T_{CRT}$, $O_{CRT}$, $D_{CRT}$, $DAC_{D_{CRT}}^{INIT}$, $DAC_{D_{CRT}}^{FOCUS}$) which satisfy the following condition: $[D_{1_F}, D_{1_N}] \cap [D_{2_F}, D_{2_N}] = \emptyset$ [25]
where:
 [$T_1$, $O_1$, $D_1$, $DAC_{D_1}^{INIT}$, $DAC_{D_1}^{FOCUS}$] is the first record.
 [$T_2$, $O_2$, $DAC_{D_2}^{INIT}$, $DAC_{D_2}^{FOCUS}$] is the second record.
 [$D_{1_F}$, $D_{1_N}$] is the DOF range at first distance $D_1$ ($D_{1_F}$ is the far limit, $D_{1_N}$ is the near limit).
 [$D_{2_F}$, $D_{2_N}$] is the DOF range at second distance $D_2$ ($D_{2_F}$ is the far limit, $D_{2_N}$ is the near limit).

If the test of equation [25] is satisfied (the two distances are quite different), then using [15] and replacing [$DAC_D$, D] with [$DAC_{D_1}^{FOCUS}$, $D_1$] and [$DAC_{D_2}^{FOCUS}$, $D_2$], the resulting $ERR_{D_1}$ and $ERR_{D_2}$ are:

$$ERR_{D_1} = DAC_{D_1}^{FOCUS} - DAC_{D_1}^{INIT} \quad [26]$$

$$ERR_{D_2} = DAC_{D_2}^{FOCUS} - DAC_{D_2}^{INIT} \quad [26]$$

where:
 $DAC_{D_1}^{INIT}$ and $DAC_{D_2}^{INIT}$ are computed using [16].

Using [17] and replacing [$ERR_D$, D] with [$ERR_{D_1}$, $D_1$] and [$ERR_{D_2}$, $D_2$], it results the following linear system:

$$\begin{cases} ERR_{D_1} = ERR_{FAR}^{PLP} + (ERR_{NEAR}^{PLP} - ERR_{FAR}^{PLP}) * \frac{(D_{FAR} - D_1)}{(D_{FAR} - D_{NEAR})} * \frac{(D_{NEAR} - f)}{(D_1 - f)} \\ ERR_{D_2} = ERR_{FAR}^{PLP} + (ERR_{NEAR}^{PLP} - ERR_{FAR}^{PLP}) * \frac{(D_{FAR} - D_2)}{(D_{FAR} - D_{NEAR})} * \frac{(D_{NEAR} - f)}{(D_2 - f)} \end{cases}$$

To simplify the above system, the following substitutions will be done:

$$\begin{cases} \alpha_{D_1} = \frac{(D_{FAR} - D_1)}{(D_{FAR} - D_{NEAR})} * \frac{(D_{NEAR} - f)}{(D_1 - f)} & [28] \\ \alpha_{D_2} = \frac{(D_{FAR} - D_2)}{(D_{FAR} - D_{NEAR})} * \frac{(D_{NEAR} - f)}{(D_2 - f)} & [29] \end{cases}$$

The new system becomes:

$$\begin{cases} ERR_{D_1} = ERR_{FAR}^{PLP}(1 - \alpha_{D_1}) + \alpha_{D_1} ERR_{NEAR}^{PLP} \\ ERR_{D_2} = ERR_{FAR}^{PLP}(1 - \alpha_{D_2}) + \alpha_{D_2} ERR_{NEAR}^{PLP} \end{cases}$$

PLP errors can now be estimated with the following formulae:

$$\begin{cases} ERR_{FAR}^{PLP} = \frac{\alpha_{D_2} * ERR_{D_1} - \alpha_{D_1} * ERR_{D_2}}{\alpha_{D_2} - \alpha_{D_1}} & [30] \\ ERR_{NEAR}^{PLP} = \frac{(1 - \alpha_{D_2}) * ERR_{D_1} - (1 - \alpha_{D_1}) * ERR_{D_2}}{\alpha_{D_1} - \alpha_{D_2}} & [31] \end{cases}$$

where:
 $ERR_{D_1}$ and $ERR_{D_2}$ are computed using [26] and [27].
 $\alpha_{D_1}$ and $\alpha_{D_2}$ are computed using [28] and [29].

The new updated calibration parameters (which should be used further to improve AF module speed and reduced lens wobble effect) are:

$$\begin{cases} DAC_{FAR}^{NEW} = DAC_{FAR}^{PLP} + ERR_{FAR}^{PLP} & [32] \\ DAC_{NEAR}^{NEW} = DAC_{NEAR}^{PLP} + ERR_{NEAR}^{PLP} & [33] \end{cases}$$

In a second embodiment of the present invention, instead of directly measuring a distance to an object in a scene being imaged, the distance can be estimated based on an assumed dimension of an object being imaged, for example, a face. More details about estimating the distance based on face information or indeed any recognizable object with a known dimension can be found in U.S. Pat. No. 8,970,770 (Ref: FN-361) and WO 2016/091545 (Ref: FN-399), the disclosures of which are herein incorporated by reference.

However, as disclosed in WO 2016/091545 (Ref: FN-399), care should be taken when doing so to ensure that the object is not a false image of an object, for example, a billboard showing a large face, or a small printed face or a small child's face, where the assumed dimension may not apply. Thus, the second embodiment aims to provide dynamic compensation to estimate $ERR_{PLP}$ while taking into account that false faces may be present in a scene.

Let assume the distance from the face to the image acquisition device is [D]. The current estimated distance [$D_{EST}$] to that face is computed with the following formula:

$$D_{EST} = f * \frac{ed}{edp * P_S} \quad [34]$$

where:
 f represents the focal length of the lens system
 $P_S$ is the pixel size
 ed represents the assumed dimension, in this case, eye distance in millimeters for a human face (ed=70 mm)
 edp represents the computed eye distance in pixels within the detected face region For those human faces (where ed≈70 mm), formula [1] will provide a good estimation of the distance ($D_{EST}$≈D).

For false faces (ex. a small printed face with ed 20 mm), formula [1] will provide a wrong distance because it assumes that ed=70 mm.

The lens position [$DAC_E$] to focus at distance [D] is given by the following formula:

$$DAC_D = DAC_{D_{EST}}^{INIT} + ERR_D \quad [2]$$

where:

$DAC_{D_{EST}}^{INIT}$, the initial lens position computed based on estimated distance [$D_{EST}$], can be calculated as per $DAC_{D_{CRT}}^{INIT}$ in equation [16]; and $$ERR_D = ERR_{PLP} + ERR_{D_{EST}} \quad [35]$$

Note that in this example, near and far PLP errors are assumed to be almost the same ($ERR_{FAR}^{PLP} \approx ERR_{NEAR}^{PLP} \approx ERR_{PLP}$) and $ERR_{D_{EST}}$ represents an error caused by the wrong estimation of the distance to an object.

Figure 3:
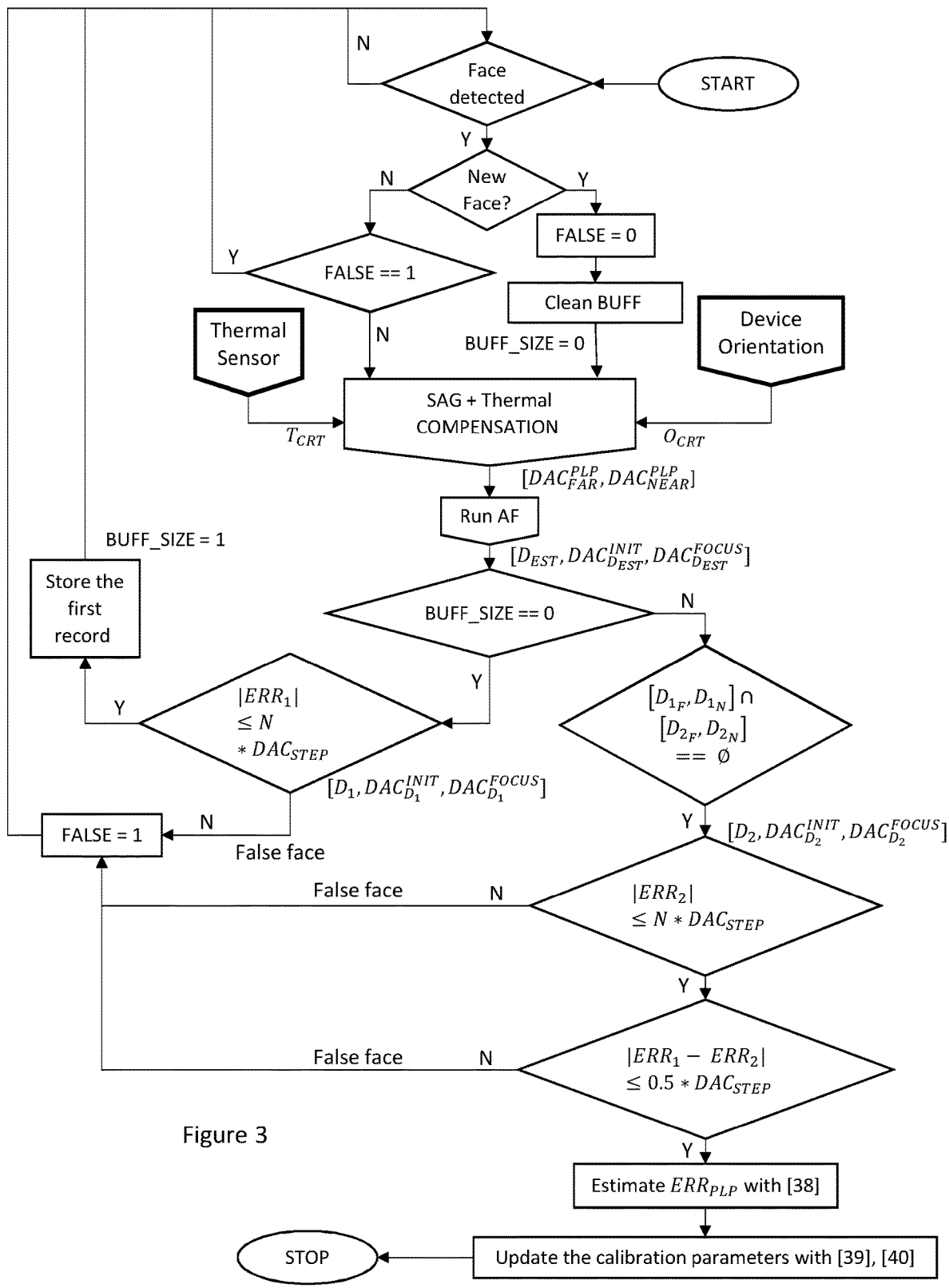
FIG. 3 illustrates a method for dynamically calibrating an image capture device according to a second embodiment of the present invention.

Referring now to FIG. 3, again the first step of dynamic compensation method is to collect into an internal buffer (BUFF) the necessary input data while the user is operating the camera. This process should be done transparently without affecting the user experience. Again, an input record should contain the data summarized in table 2, but instead of the measured $D_{CRT}$ of the first embodiment, $D_{EST}$ the estimated distance is used. The buffer should have enough space to store at least 2 records.

The second step of dynamic compensation process is to estimate $ERR_{PLP}$ and to update the calibration parameters. The embodiment attempts to image a given face at two separate distances, although in variants of the embodiment, measurements from images of different faces could be employed. In any case as in the first embodiment, two input records ($T_{CRT}$, $O_{CRT}$, $D_{EST}$, $DAC_{D_{EST}}^{INIT}$, $DAC_{D_{EST}}^{FOCUS}$) are required which satisfy the following conditions:

a) $[D_{1_F}, D_{1_N}] \cap [D_{2_F}, D_{2_N}] = \emptyset$ where:

[$T_1$, $O_1$, $D_1$, $DAC_{D_1}^{INIT}$, $DAC_{D_1}^{FOCUS}$] is the first record;
[$T_2$, $O_2$, $D_2$, $DAC_{D_2}^{INIT}$, $DAC_{D_2}^{FOCUS}$] is the second record;

[$D_{1_F}$, $D_{1_N}$] is the DOF range for the first estimated distance ($D_{1_F}$ is the far limit, $D_{1_N}$ is the near limit); and

[$D_{2_F}$, $D_{2_N}$] is the DOF range for the second estimated distance ($D_{2_F}$ is the far limit, $D_{2_N}$ is the near limit).

b) $|ERR_1| \leq N*DAC_{STEP}$
$|ERR_2| \leq N*DAC_{STEP}$
$|ERR_1 - ERR_2| < DAC_{STEP}/2$ where $DAC_{STEP}$ is determined as per equation [24] of the first embodiment;

$$ERR_1 \stackrel{[2]}{=} DAC_{D_1}^{FOCUS} - DAC_{D_1}^{INIT}; \text{ and} \quad [36]$$

$$ERR_2 \stackrel{[2]}{=} DAC_{D_2}^{FOCUS} - DAC_{D_2}^{INIT}. \quad [37]$$

As before, the first condition (a), requires that the two distances should be different.

The second condition (b), requires that the object being imaged indeed exhibits the assumed dimension so that a given face to be a live human face, ed≈70 mm. In this case, the errors should not be larger than the maximum error ($N*DAC_{STEP}$) and they should be quite similar (the difference should not be higher than half $DAC_{STEP}$). This condition assures that $ERR_{EST} \approx 0$ and $ERR_D \approx ERR_{PLP}$ as in the first embodiment.

If the current face is false (condition (b) is not respected), and so compensation must not be done until a new valid face is received.

If conditions (a) and (b) are respected, them $ERR_{PLP}$ will be estimated as follows:

$$ERR_{PLP} = \frac{ERR_1 + ERR_2}{2} \quad [38]$$

The new updated calibration parameters (which should be used further to improve AF speed and reduced lens wobble effect) are:

$$\begin{cases} DAC_{FAR}^{NEW} = DAC_{FAR}^{PLP} + ERR_{PLP} & [39] \\ DAC_{NEAR}^{NEW} = DAC_{NEAR}^{PLP} + ERR_{PLP} & [40] \end{cases}$$

As indicated, the maximum estimated error should not be higher than $N*DAC_{STEP}$ ($ERR^{PLP} < N*DAC_{STEP}$). The value of N can be determined by the image acquisition device or camera module manufacturer according to how tightly they wish the estimated compensation process to operate. Thus, the larger the value of N the greater the possibility of calibrating based on a poorly estimated distance to an object.

It will be appreciated that many variations of the above described embodiments are possible and that for example features and functions described in relation to the first embodiment are applicable to the second embodiment and vice versa where possible.

The invention claimed is:

1. A method for calibrating an image capture device comprising:
   a) determining a first lens actuator setting for a first determined distance to an object in a scene to be imaged by an image capture device;
   b) determining a second lens actuator setting providing a greater sharpness than the first lens actuator setting;
   repeating a) and b) at a second determined distance different than the first determined distance;
   determining a calibration correction to obtain a determined calibration correction based at least in part on:
       a difference between the first lens actuator setting and the second lens actuator setting for the first determined distance; and
       a difference between the first lens actuator setting and the second lens actuator setting for the second determined distance; and
   adjusting a stored calibrated lens actuator setting based at least on the determined calibration correction.

2. The method of claim 1, wherein determining the first lens actuator setting comprises determining the first lens actuator setting as a function of a first calibrated lens actuator setting for a pre-determined near focus distance, a second calibrated lens actuator setting for a pre-determined far focus distance, a focal length of the image capture device, and the first determined distance.

3. The method of claim 2, further comprising, determining the calibration correction for at least one of the first calibrated lens actuator setting or the second calibrated lens actuator setting as a function of at least one of:
   a difference between the first determined distance and the second determined distance and one of the pre-determined near or far focus distances;
   a difference between the pre-determined near focus distance and the pre-determined far focus distance; and
   a difference between the first determined distance and the second determined distance, and the focal length.

4. The method of claim 1, further comprising storing the first determined distance, the first lens actuator setting and the second lens actuator setting in memory of the image capture device.

5. The method of claim 1, further comprising, prior to determining the first lens actuator setting:
adjusting the stored calibrated lens actuator setting as a function of at least one of an operating temperature of the image capture device, or a function of an operating orientation of the image capture device; and
storing the at least one of the operating temperature, or the operating orientation of the image capture device with the first determined distance, the second determined distance, the first lens actuator setting, and the second lens actuator setting in memory of the image capture device.

6. The method of claim 1, wherein determining the second lens actuator setting comprises beginning a search for a focus position using the first lens actuator setting.

7. The method of claim 1, further comprising calibrating a camera module of the image capture device based on a linear relationship between the first lens actuator setting or the second lens actuator setting and a lens position that focuses at a given distance.

8. The method of claim 1, wherein determining the first determined distance and the second determined distance to the object comprises:
estimating a distance to the object to obtain an estimated distance based on an imaged size of the object and an assumed dimension of the object; and
testing whether a potential correction resulting from the estimated distance exceeds a threshold value before at least one of:
storing the first determined distance, the first lens actuator setting, and the second lens actuator setting in memory of the image capture device; or
determining the calibration correction,
wherein the threshold value is a function of an absolute difference between a respective one of the first lens actuator setting or the second lens actuator setting at a far limit of focus and a near limit of focus at a given focus distance.

9. A non-transitory computer readable medium comprising:
computer readable instructions embodied therewith, the computer readable instructions to, when executed by a processor:
a) determine a first lens actuator setting for a first determined distance to an object in a scene to be imaged by an image capture device;
b) determine a second lens actuator setting providing a greater sharpness than the first lens actuator setting;
repeat a) and b) at a second determined distance different than from the first determined distance; and
determine a calibration correction based at least in part on:
a difference between the first lens actuator setting and the second lens actuator setting for the first determined distance; and
a difference between the first lens actuator setting and the second lens actuator setting for the second determined distance.

10. The non-transitory computer readable medium of claim 9, wherein:
determining the first lens actuator setting comprises determining the first lens actuator setting as a function of a stored calibrated lens actuator setting for a pre-determined near focus distance, a stored calibrated lens actuator setting for a pre-determined far focus distance, a focal length of the image capture device, and the first determined distance; and
determining the second lens actuator setting comprises determining the second lens actuator setting providing a greater sharpness than the first lens actuator setting for the object in a captured image of the scene.

11. The non-transitory computer readable medium of claim 9, wherein determining the first lens actuator setting is based on the following formula:

$$DAC^{INIT} = DAC_{FAR}^{PLP} + (DAC_{NEAR}^{PLP} - DAC_{FAR}^{PLP}) * \frac{(D_{FAR} - D_{CRT,EST})}{(D_{FAR} - D_{NEAR})} * \frac{(D_{NEAR} - f)}{(D_{CRT,EST} - f)}$$

where
$DAC_{FAR}^{PLP}$ is a second calibrated lens actuator setting for a pre-determined far focus distance;
$DAC_{NEAR}^{PLP}$ is a first calibrated lens actuator setting for a pre-determined near focus distance;
$D_{FAR}$ is a far focus distance;
$D_{NEAR}$ is a near focus distance;
$D_{CRT,EST}$ is the first determined distance; and
f is a focal length.

12. The non-transitory computer readable medium of claim 9, wherein the calibration correction for calibrated lens actuator settings, $ERR_{FAR}^{PLP}$ and $ERR_{NEAR}^{PLP}$, is calculated based on the following formulae:

$$\begin{cases} ERR_{FAR}^{PLP} = \frac{\alpha_{D_2} * ERR_{D_1} - \alpha_{D_1} * ERR_{D_2}}{\alpha_{D_2} - \alpha_{D_1}} \\ ERR_{NEAR}^{PLP} = \frac{(1 - \alpha_{D_2}) * ERR_{D_1} - (1 - \alpha_{D_1}) * ERR_{D_2}}{\alpha_{D_1} - \alpha_{D_2}} \end{cases}$$

where $D_1$ and $D_2$, are the first and second determined distances respectively, $ERR_{D_1}$ and $ERR_{D_2}$ are computed using the following formulae:

$$ERR_{D_1} = DAC_{D_1}^{FOCUS} - DAC_{D_1}^{INIT} \quad [26]$$

$$ERR_{D_2} = DAC_{D_2}^{FOCUS} - DAC_{D_2}^{INIT} \quad [26]$$

and $\alpha_{D_1}$ and $\alpha_{D_2}$ are computed using the following formulae:

$$\begin{cases} \alpha_{D_1} = \frac{(D_{FAR} - D_1)}{(D_{FAR} - D_{NEAR})} * \frac{(D_{NEAR} - f)}{(D_1 - f)} \\ \alpha_{D_2} = \frac{(D_{FAR} - D_2)}{(D_{FAR} - D_{NEAR})} * \frac{(D_{NEAR} - f)}{(D_2 - f)} \end{cases}.$$

13. The non-transitory computer readable medium of claim 9, further comprising adjusting stored calibrated lens actuator settings comprises providing new settings $DAC_{FAR}^{NEW}$ and $DAC_{NEAR}^{NEW}$ based on the formulae:

$$\begin{cases} DAC_{FAR}^{NEW} = DAC_{FAR}^{PLP} + ERR_{FAR}^{PLP} \\ DAC_{NEAR}^{NEW} = DAC_{NEAR}^{PLP} + ERR_{NEAR}^{PLP} \end{cases}.$$

14. An image capture device comprising:
a lens actuator mechanically coupled a lens to adjust a position of the lens;
a digital-to-analog converter (DAC) electrically coupled to the lens actuator to drive the lens actuator; and
an auto-focus (AF) module electrically coupled to the DAC and the lens actuator to determine a DAC code, the DAC to convert the DAC code into an equivalent analog signal to drive the lens actuator, wherein the AF module:
 a) determines a first lens actuator setting as a function of: a stored calibrated lens actuator setting for a pre-determined near focus distance, a stored calibrated lens actuator setting for a pre-determined far focus distance, a focal length of the image capture device, and a first determined distance;
 b) determines a second lens actuator setting providing maximum sharpness for an object in a captured image of a scene;
 repeats a) and b) at a second determined distance different than the first determined distance; and
 determines a calibration correction for a calibrated lens actuator setting to obtain a determined calibration correction as a function of:
  a difference between the first lens actuator setting and the second lens actuator setting for the first determined distance; and
  a difference between the first lens actuator setting and the second lens actuator setting for the second determined distance; and
 adjusts a stored calibrated lens actuator setting based on the determined calibration correction.

15. The image capture device of claim 14, further comprising a laser device or a stereo camera system to determine the first determined distance and the second determined distance.

16. The image capture device of claim 14, wherein the first determined distance and the second determined distance are different than one another by depths of field at the first determined distance and the second determined distance.

17. The image capture device of claim 14, wherein adjusting the stored calibrated lens actuator setting comprises adjusting the stored calibrated lens actuator setting as a function of at least one of an operating temperature of the image capture device, or a function of an operating orientation of the image capture device.

18. The image capture device of claim 17, further comprising non-volatile memory to store at least one of the first lens actuator setting, the second lens actuator setting, the first determined distance, the second determined distance, the calibration correction, the a pre-determined near focus distance, the pre-determined far focus distance, the focal length, the operating temperature, the operating orientation of the image capture device or the stored calibrated lens actuator setting.

19. The image capture device of claim 17, wherein the AF module:
 estimates a distance to the object to obtain and estimated distance based on an imaged size of the object and an assumed dimension of the object; and
 tests whether a potential correction resulting from the estimated distance exceeds a threshold value before at least one of:
  storing the first determined distance, the first lens actuator setting, and the second lens actuator setting in memory of the image capture device; or
  determining the calibration correction,
 wherein the threshold value is a function of an absolute difference between a respective one of the first lens actuator setting or the second lens actuator setting at a far limit of focus and a near limit of focus at a given focus distance.

20. The image capture device of claim 14, wherein the AF module defines a linear relationship between the lens actuator and a position of the lens to focus at a given distance.

* * * * *